United States Patent
Fan

(10) Patent No.: US 10,530,853 B2
(45) Date of Patent: Jan. 7, 2020

(54) MULTI-SCREEN APPLICATION ENABLING AND DISTRIBUTION SERVICE

(71) Applicant: Futurewei Technologies, Inc., Plano, TX (US)

(72) Inventor: Guangbin Fan, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 779 days.

(21) Appl. No.: 14/105,097

(22) Filed: Dec. 12, 2013

(65) Prior Publication Data

US 2014/0164520 A1 Jun. 12, 2014

Related U.S. Application Data

(60) Provisional application No. 61/736,397, filed on Dec. 12, 2012.

(51) Int. Cl.
*G06F 15/16* (2006.01)
*H04L 29/08* (2006.01)

(52) U.S. Cl.
CPC ............... *H04L 67/1095* (2013.01)

(58) Field of Classification Search
CPC .................................................. H04L 67/1095
See application file for complete search history.

(56) References Cited

U.S. PATENT DOCUMENTS

| 8,352,879 | B2 | 1/2013 | Leung et al. |
| 8,826,240 | B1 * | 9/2014 | Lachwani ........... G06F 11/3604 717/126 |
| 9,449,294 | B2 | 9/2016 | Hwang et al. |
| 2007/0162541 | A1 | 7/2007 | Dhawan et al. |
| 2007/0219917 | A1 * | 9/2007 | Liu ................ G06F 21/10 705/59 |
| 2010/0262958 | A1 | 1/2010 | Clinton et al. |

(Continued)

FOREIGN PATENT DOCUMENTS

| EP | 2519017 A2 | 10/2012 |
| JP | 09101986 A | 4/1997 |

(Continued)

OTHER PUBLICATIONS

Foreign Communication From A Counterpart Application, PCT Application No. PCT/US2013/074827, International Search Report dated Apr. 24, 2014, 4 pages.

(Continued)

*Primary Examiner* — Atta Khan
(74) *Attorney, Agent, or Firm* — Conley Rose, P.C.

(57) ABSTRACT

A method implemented by an application (app) store system for providing apps to one or more users through a network, the method comprising managing, by the app store system, a multi-screen application (MSA) package that comprises a set of related apps, wherein one or more relationships among the set of related apps are pre-defined, receiving, by the app store system, a request from a first user device via the network to download at least part of the MSA package; and causing, by the app store system, the set of related apps to be downloaded to a plurality of user devices including the first user device according to the one or more relationships among the set of related apps in response to the request.

9 Claims, 11 Drawing Sheets

(56) References Cited

U.S. PATENT DOCUMENTS

| | | | |
|---|---|---|---|
| 2010/0057674 A1* | 3/2010 | O'Donnell | G06Q 30/00 707/E17.044 |
| 2010/0114714 A1* | 5/2010 | Vitek | G06Q 30/00 705/14.69 |
| 2010/0146442 A1 | 6/2010 | Nagasaka et al. | |
| 2010/0162233 A1 | 6/2010 | Ku et al. | |
| 2012/0011027 A1 | 1/2012 | Okuyama | |
| 2012/0124028 A1 | 5/2012 | Tullis et al. | |
| 2012/0203862 A1* | 8/2012 | Tayeb | G06F 8/61 709/217 |
| 2012/0245988 A1* | 9/2012 | Pace | G06Q 30/0283 705/14.25 |
| 2012/0246291 A1 | 9/2012 | Wong et al. | |
| 2012/0290583 A1* | 11/2012 | Mahaniok | G06F 8/60 707/741 |
| 2013/0024852 A1* | 1/2013 | Firman | G06F 8/60 717/170 |
| 2013/0191757 A1* | 7/2013 | Smith | G06F 3/0488 715/748 |
| 2013/0219381 A1* | 8/2013 | Lovitt | G06F 8/65 717/173 |
| 2013/0239104 A1* | 9/2013 | Savant | G06F 21/121 717/178 |
| 2013/0337793 A1* | 12/2013 | Prakash | H04W 8/22 455/418 |
| 2014/0215457 A1* | 7/2014 | Gava | H04L 67/1095 717/178 |
| 2014/0279216 A1* | 9/2014 | Desmarais | G06Q 30/0633 705/26.8 |
| 2015/0154592 A1* | 6/2015 | Ioannidis | G06Q 20/3224 705/64 |

FOREIGN PATENT DOCUMENTS

| | | | |
|---|---|---|---|
| JP | 2002073191 A | 3/2002 | |
| JP | 2004005442 A | 1/2004 | |
| JP | 2005032184 A | 2/2005 | |
| JP | 2008542909 A | 11/2008 | |
| JP | 2010157207 A | 7/2010 | |
| JP | 2011170741 A | 9/2011 | |
| JP | 2012234545 A | 11/2012 | |
| KR | 20120090388 A | 8/2012 | |
| WO | 2006130265 A2 | 12/2006 | |
| WO | 2007018369 A1 | 2/2007 | |
| WO | 2010109776 A1 | 9/2010 | |
| WO | 2011102000 A1 | 8/2011 | |
| WO | WO 2014054964 A1 * | 4/2014 | ............ G04G 21/02 |

OTHER PUBLICATIONS

Foreign Communication From a Counterpart Application, PCT Application No. PCT/US2013/074827, International Report dated Apr. 24, 2014, 4 pages.

Foreign Communication From a Counterpart Application, PCT Application No. PCT/US2013/074827, Written Opinion dated Apr. 24, 2014, 10 pages.

Yamamoto, N., et al., "Improvement of password authentification that uses cellular phone and two dimension bar code," The Institute of Electronics, Information and Communication Engineers, IEICE Technical Report, Jul. 2009, pp. 111-114.

Partial English Translation and Abstract of Japanese Patent Application No. JPA2002073191, Aug. 26, 2016, 31 pages.

Partial English Translation and Abstract of Japanese Patent Application No. JPA2004005442, Aug. 26, 2016, 64 pages.

Partial English Translation and Abstract of Japanese Patent Application No. JPA2005032184, Aug. 26, 2016, 37 pages.

Partial English Translation and Abstract of Japanese Patent Application No. JPA2008542909, Aug. 26, 2016, 48 pages.

Partial English Translation and Abstract of Japanese Patent Application No. JPA2011170741, Aug. 26, 2016, 34 pages.

Partial English Translation and Abstract of Japanese Patent Application No. JPA2012234545, Aug. 26, 2016, 48 pages.

Partial English Translation and Abstract of Japanese Patent Application No. JPH09101986, Aug. 26, 2016, 51 pages.

Foreign Communication From a Counterpart Application, Japanese Application No. 2015-547577, Japanese Application No. 2015-547577, Japanese Office Action dated Jul. 26, 2016, 7 pages.

Foreign Communication From a Counterpart Application, Japanese Application No. 2015-547577, English Translation of Japanese Application No. 2015-547577, Japanese Office Action dated Jul. 26, 2016, 8 pages.

Foreign Communication From a Counterpart Application, Korean Application No. 10-2015-7017693, Korean Office Action dated Dec. 21, 2016, 8 pages.

Foreign Communication From a Counterpart Application, Korean Application No. 10-2015-7017693, English Translation of Korean Office Action dated Jan. 4, 2017, 11 pages.

* cited by examiner

1000

| App | MSA License | License Type | Licenses | |
|---|---|---|---|---|
| App X | ML1 | Multiple | L1,L2, …. | |
| App X | ML2 | Time share | L3 | |
| App X | ML3 | Android 1, Windows 1, Blackberry1 | L1, L2, L3 | |
| App Y | … | … | … | |
| App Y | | | | |
| App Z | | | | |

1020

| App | License | Validity | User | Device |
|---|---|---|---|---|
| App X | L1 | 1 year | User x | Android |
| App X | L3 | 1 day | User y | iOS |
| App X | … | … | … | … |

MULTI-SCREEN APPLICATION ENABLING AND DISTRIBUTION SERVICE

CROSS-REFERENCE TO RELATED APPLICATIONS

The present application claims priority to U.S. Provisional Patent Application No. 61/736,397 filed Dec. 12, 2012 by Guangbin Fan and entitled "Multi-Screen Application Enabling and Distribution Service", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Multi-screen applications (MSAs) are getting increasingly popular, but there still lacks a reliable way for purchase and distribution of bundled applications (apps). For example, a user may wish to use multiple related apps or different versions of the same app on multiple user devices or screens (e.g., a control app on a smartphone or a tablet, a display app on a television, and a mini-version of the control app on a smart watch).

Current app stores may be designed for a single operating system (OS), such as IOS® and ANDROID®, with similar screens. Popular app stores such as GOOGLE PLAY®, (offered by GOOGLE® Inc.) and AppStore (offered by APPLE® Inc.) may be mainly used for single OS app distributions. As a result, using existing technologies, a user may need to separately buy and download apps for different screens, which may run on different OS (e.g., a smartphone running ANDROID® and an IPAD® running IOS®). In addition, sometimes it may be difficult for a user to find an exact match for MSAs (e.g., what television app corresponds to a smartphone YOUTUBE® app?). When the amount of related apps increases, the user may get especially confused as to which app to use. Thus, it is desirable to develop app store features that support distribution of apps on multiple user devices and matching of related apps to improve user experience.

SUMMARY

In one embodiment, the disclosure includes a method implemented by an application (app) store system for providing apps to one or more users through a network, the method comprising managing, by the app store system, a multi-screen application (MSA) package that comprises a set of related apps with one or more pre-defined relationships among the set of related apps, receiving, by the app store system, a request from a first user device via the network to download at least part of the MSA package; and causing, by the app store system, the set of related apps to be downloaded to a plurality of user devices including the first user device according to the one or more relationships among the set of related apps in response to the request.

In another embodiment, the disclosure includes an app store system for providing apps to one or more users through a network, the app store system comprising a receiver configured to receive a request from a first user device via the network to download at least part of a multi-screen application (MSA) package, wherein the MSA package comprises a set of related apps, and a processor coupled to the receiver and configured to define, one or more relationships among the set of related apps in the MSA package according to an MSA package policy, and, in response to the request, cause the set of related apps to be downloaded to a plurality of user devices including the first user device according to the one or more relationships.

In yet another embodiment, the disclosure includes a computer program product comprising computer executable instructions stored on a non-transitory computer readable medium such that when executed by a processor cause a network device to receive a request from a first user device to download at least a first content version, push the first content version to be downloaded to the first user device, and push one or more content second versions related to the first content version to be downloaded by one or more second user devices associated with the first user device.

In yet another embodiment, the disclosure includes a method comprising installing a first app on a first user device, sending a search request to an app store system via a network for discovery of one or more apps related to the first app, wherein the first app and the one or more apps belong to a multi-screen application (MSA) package receiving information identifying the one or more apps from the app store system via the network, and instructing the app store system to push the one or more apps to be downloaded to one or more user devices, which are associated with a user operating the first user device, according to one or more relationships between the first app and the one or more apps.

In yet another embodiment, the disclosure includes an apparatus comprising a processor configured to install a first app, a transmitter coupled to the processor and configured to send a search request to an app store system via a network for discovery of one or more apps related to the first app, wherein the first app and the one or more apps belong to an MSA package, and a receiver coupled to the processor and configured to receive information identifying the one or more apps from the app store system via the network, wherein the processor is further configured to instruct the app store system to push the one or more apps to be downloaded to one or more user devices, which are associated with a user operating the first user device, according to one or more relationships between the first app and the one or more apps.

In yet another embodiment, the disclosure includes a network system comprising a first user device configured to send a request to an app store system to download at least part of an MSA package, wherein the MSA package comprises a set of related apps, and the app store system configured to define, one or more relationships among the set of related apps in the MSA package, and receive the request from the first user device via a network, and, in response to the request, initiate the set of related apps to be downloaded to a plurality of user devices including the first user device according to the one or more defined relationships.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description.

DETAILED DESCRIPTION

Figure 1:
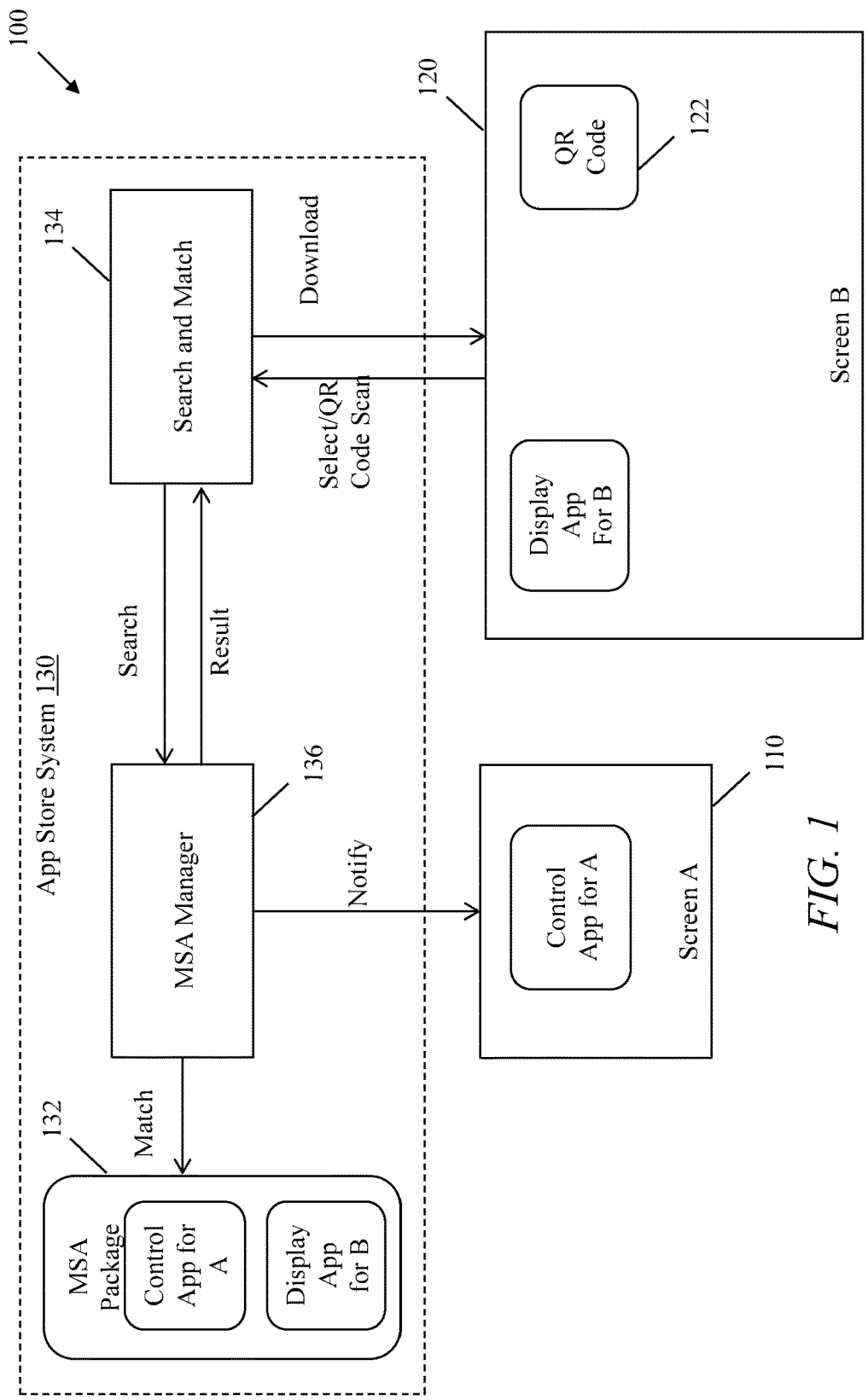
FIG. 1 is a schematic diagram of a multi-screen application (MSA) distribution architecture.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Embodiments disclosed herein may enable an application (app) store system to implement provisioning, selling, and distribution of multi-screen applications (MSAs) to its users. This disclosure may provide bundling and automatic push installation for related apps in an MSA package. One or more developers may package or bundle a set of related apps into an MSA package and define relationships among the related apps. Also in an example, the app store system may also package or bundle a set of related apps into an MSA package and define relationships among the related apps based on its policy related to sale, promotion, or technology requirement of the app for the multi-screens or multi-devices, or based on the requirements from one or more users. A user accessing the app store system may also define a user customized relationship among the related apps if desired. In another example, the app store may communication the systems of one or more developers the packaging or bundling requirement.

In an embodiment, the app store may offer the MSA package for sale as a whole at a discount price or offer various combinations of the apps in the package based on certain considerations (e.g., promotion policy). When a user purchases the MSA package, the app store system may cause (e.g., by pushing) the set of related apps to be downloaded to a plurality of user devices. In another embodiment, when a user downloads a first app, a matching service may be provided by the app store to match or identify one or more second apps related to the first app. Thus, the user may no longer need to rely on an app name to search for related apps. Matching may be automatically performed without any additional request from the user or may be initiated by a request of the user.

Disclosed embodiments may provide mechanisms for control of one or more licenses corresponding to an MSA package, which may use a sharable license, multiple licenses, or a linearly multi-user sharing license. Downloading and usage of apps may be controlled by the licenses, which may be one of the relationships defined in an MSA package. Further, similar to apps, related contents or multiple versions of the same content may be packed into a content package, and be similarly shared among multiple user devices or screens using principles disclosed herein. Automatic provisioning and distribution of apps or contents enabled by embodiments may improve user experience in various computing environments such as in mobile devices, cloud terminal, or wearable devices.

FIG. 1 is a schematic diagram of a MSA distribution architecture 100 in accordance with a disclosed embodiment. The architecture 100 may be a network system comprising a plurality of user devices, e.g., a first user device 110 and a second user device 120, and an app store system 130 remotely coupled to the user devices. The user device 110 or 120 may be any applicable type of electronic devices for consumer use. Examples of user devices include, but are not limited to, smartphone, tablet, television, projector, smart watch, smart glasses (e.g., GOGGLE GLASS®), wearable gadgets (e.g. smart wristband, t-shirts, necklaces, or shoes), media (e.g., music and/or video) players, game players, game consoles and controllers, electronic book (ebook) reader, cloud terminal, and in-car media system. The user device 110 or 120 may be a wearable device (e.g., smart watch or smart glass) or a non-wearable device (e.g., television or tablet). Further, the user device 110 or 120 may have any suitable operating system (OS), such as ANDROID®, IOS®, WINDOWS®, LINUX®, UNIX®, and so forth. As the user devices 110 and 120 mostly have a display or screen as an interface for communication with a user, a user device disclosed herein may sometimes be referred to simply as a screen. As shown in FIG. 1, screen A and screen B refer to the user devices 110 and 120, respectively. Thus, the term "MSA" or "MSA package" may refer to an app or a set of related apps used by multiple user devices.

It should be understood that an app store system as used herein is a generic term referring to one or more network servers providing application services to its customers or users. For example, the app store system 130 may be the server end of a mobile application store such as APPLE's® AppStore, GOOGLE PLAY®, AMAZON's® AppStore, or any other application store, or combinations of multiple app stores. The app store system 130 may also be another entity managing one or more app stores, but may or may not host apps itself. Note that an app store system may sometimes be referred to herein in short as an app store. The app store system 130 may be connected to the user devices 110 and 120 via any suitable type of network, e.g., via a fourth-generation (4G) mobile network or a wired/wireless Internet connection. The user devices 110 and 120 may have dedicated apps or software (e.g., GOOGLE PLAY® App and AppStore App) installed thereon to communicate with the app store system 130.

The app store system 130 may comprise various functional modules or units configured to provide application services to users of the app store system 130. In an embodiment, the app store system 130 may manage an MSA package 132, which may contain a set of related apps with pre-defined relationships. For example, the app store system 130 may host or store the apps, or may call the apps from a separate app store. Depending on the apps, the relationships in the MSA package 132 may be any suitable type, such as a play-control relationship, a control-display relationship, a full version-mini version relationship, a hooking relationship, different versions of the same app (depending on device types or operating systems), or combinations thereof. Note that the MSA package 132 may be a bundle of any suitable type of apps, as long as there exists some relationships among some or all of the apps. The pre-defined relationships in the MSA package 132 may be defined by a number of entities and may be updated when necessary. For example, the relationships may be defined by app developers when configuring the MSA package 132, and such information may be stored in the app store 134. In another embodiment, the relationships may be defined by the app store or the user and then the app store use the defined relationship to package or bundle the apps from the app developers and accordingly generate a variety of MSA package. In yet another embodiment, the app store system may communicate the defined relationship to the system of the app developers through the network, and get the defined MSA package based on the relationship from the app developer system. The relationships may be updated anytime if desired.

As used herein, apps in an MSA package may refer to different apps associated with one another or different versions of the same app. In a first example shown in FIG. 1, the MSA package 132 comprises a control app for screen A and a display app for screen B. The control app may be GOOGLE's CHROMECAST ® installed on a smartphone or tablet, and the display app may be GOOGLE's YOUTUBE®installed on a big screen television or projector. Alternatively, the control app may be a game controller, and the display app may be a game display app. In an embodiment, related apps in the MSA package 132 may be integrative parts providing a certain service (e.g., a health service may have an ANDROID® app to perform setting and other functions, a smart watch app to track and collect data and provide simple statistics, and a television app to enable family health monitoring), or may be peering apps that lead to enhancement of user experience (e.g., CHROMECAST® allows a user to watch YOUTUBE® on a big screen high definition television (HDTV) rather than a small smartphone). In a second example, the MSA package 132 may comprise a first version of the ANGRY BIRD™ App for screen A and a second version of the ANGRY BIRD™ App for screen B. In this case, each version of the same app may be designed or tailored to fit the characteristics of a different device (e.g., ANGRY BIRD™ for an HDTV may require higher image definition than a tablet).

Suppose the MSA package 132 comprises a first app and one or more related apps. In use, a first user device such as the user device 110 may send a request to the app store system 130 to download the first app, and the app store may push the first app to be downloaded to the first user device. After a user downloads the first app from the app store system 130 and installs the first app on the first user device, the app store system 130 may search for the related apps and match them to the first app, e.g., by using a search and match module 134. The search and match may be implemented in various ways. In a first example, after installing the first app, the user may initiate the search by sending a request to the app store system 130 to match one or more apps to the first app. Upon receiving the request, an MSA management module or manager 136 in the app store system 130 may identify the MSA package 132, which may or may not be known by the user as bundling of the MSA package 132 is done by the app store or one or more app developers. After identifying the MSA package 132, the MSA manager 136 may notify the user device 110 of the related apps. The user may decide whether to install the related apps on other devices such as the user device 120. In another embodiment, the app store may directly to push the related apps to be installed in the corresponding user device (for example the user's another device with different OS or some other's device having a certain relationship with the user, e.g. family members relationship) in a certain circumstance, for example, when the MSA package 132 includes peer apps need to work together to perform certain function, the purchase the first app indicates that the related apps are free. The user may scan a quick response (QR) code 122 displayed on the user device 120, and send the QR code to the app store to facilitate the download process. Thus, the MSA manager 136 may manage apps (e.g., after the user downloads one app on a screen, the MSA manager 136 may be used by the user to query for a matching app to be downloaded onto another screen).

In a second example, when the first app is requested by the user device 110, the app store system 130 may automatically (i.e., without needing any additional request from the user device 110) determine that the first app is part of the MSA package 132. Thus, the app store system 130 may offer the MSA package 132 for sale to the user as a bundle at a discount price, or provide the related apps in the MSA package 132 as gift for promotion purpose. The user may give consent to purchase the MSA package 132, e.g., by indicating to the app store system 130 that he or she wishes to install the MSA package 132 for a plurality of user devices. Then, the app store system 130 may push apps of the MSA package 132 to be downloaded onto the plurality of user devices. Alternatively, after the user purchases the first app, the app store system 130 may give the user an option whether to purchase any additional related app. Upon approval of the user, the app store system 130 may push related apps to be downloaded and installed on one or more user devices associated with the first user device 110.

Note that related apps in the MSA package 132 may use individual licenses or may share a common license. Licensing between the related apps may be viewed as one of the relationships in the MSA package 132, and such a relationship may be defined by the app store system 130 or app developers. The license may be granted by the app store system 130 upon completion of purchase or download, and may be valid for any suitable period of time. If a single license is shared among the related apps, time share may be used which allows one active user device at a time, or the total time of all the apps in the MSA package 132 is counted together, the user may activate multiple devices to use the apps as long as remaining time is available.

It should be understood that, although the present disclosure mainly discusses MSAs, one of ordinary skill in the art will recognize that content may be similarly shared among multiple user devices or screens using principles disclosed herein. Any suitable type of content, such as video, audio, image, other media, and e-book may be shared among multiple screens. A content may be provided by an app store or any other content provider. In use, multiple versions of the same content or related contents may be shared. For example, a first version of a video content may have high definition for television viewing, while a second version of the same video content may have low definition for smartphone viewing. Further, the audio part of the video content may be extracted and played on a smart watch. Similar to related apps, contents may be distributed to multiple user devices using one sharable license or multiple licenses. The disclosure may enable app or content sharing among screens if the app or content specifies sharing.

Figure 2:
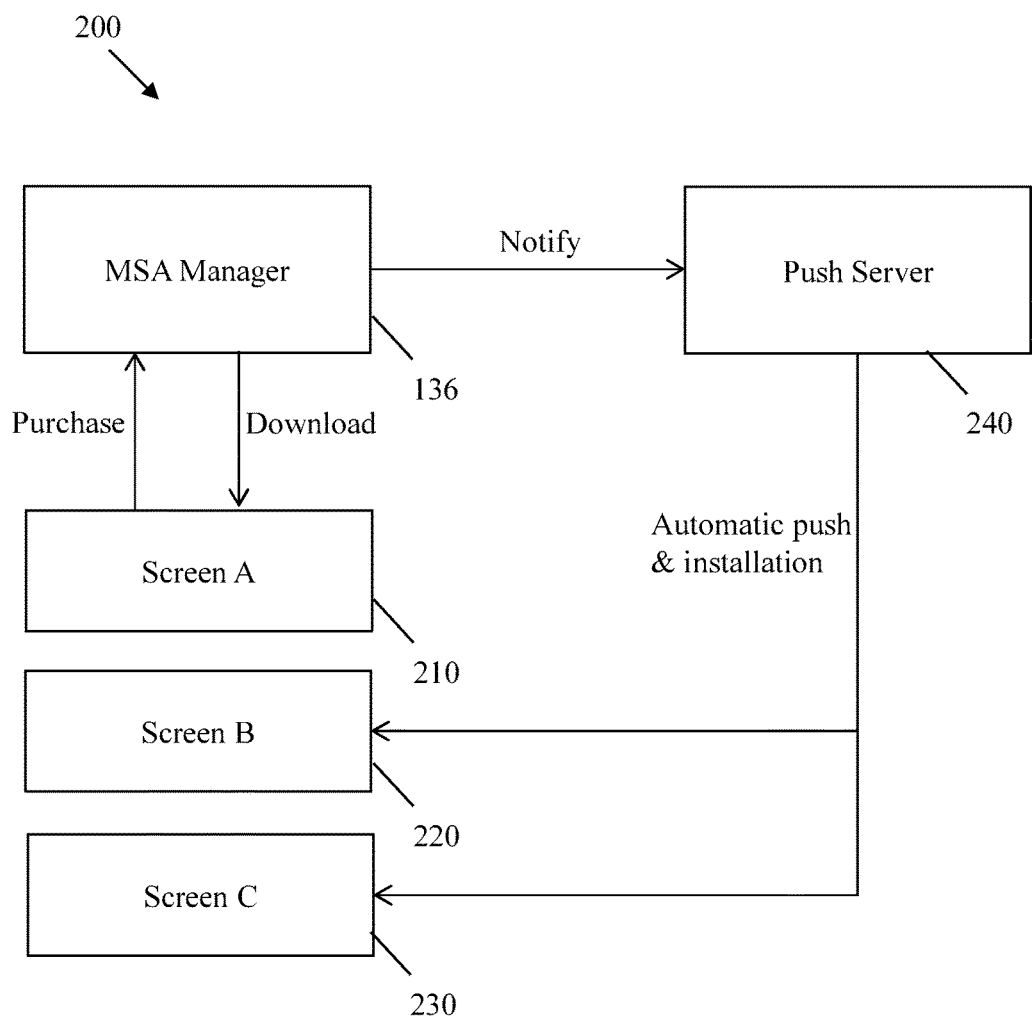
FIG. 2 is a schematic diagram of a push and synchronization (sync) procedure for MSA distribution.

FIG. 2 is a schematic diagram of a push and synchronization (sync) procedure 200 for app distribution, in accordance with a disclosed embodiment. As one of ordinary skill in the art understands, some aspects of FIG. 2 are the same as or similar to FIG. 1, thus in the interest of conciseness, further descriptions focus on aspects that are f different or yet to be covered. The same principle also applies to other drawings disclosed herein.

The procedure 200 may be triggered by app selection on one screen. When a user purchases and downloads a first app on a first user device 210, one or more related apps or different app versions designed for other devices of the user or devices for other user having certain relationship with the user as recognized by the app store, including user devices 220 and 230, may be provisioned together through push and install. Specifically, an MSA manager 136 may notify a push server 240, which may reside within or outside an app store. After receiving the notification, the push server 240 may automatically push the related apps to be downloaded to the user devices 220 and 230. The push server 240 may be a third party server implemented in an app store system or in another entity.

In use, the MSA manager 136 may either directly notify user devices 220 and 230 to download the related apps, or notify the push server 240 that can push installation to the user devices 220 and 230. The push server 240 may host an app package, so if the user devices 220 and 230 are registered with the app store, the push server 240 can automatically push installations on the user devices 220 and 230. In one embodiment, the MSA manager 136 may get the apps from other app store system or from the app developers and then package or bundle the obtained apps to a MSA package 132, and provide the MSA service to the user after getting the request from the user. In another embodiment, after getting the purchase request from the first app, the MSA manager 136 may get all the apps including the first app and the other related apps from the other app store or app developers according to the MSA packaging and bundling police store in the MSA manager 136.

Figure 3:
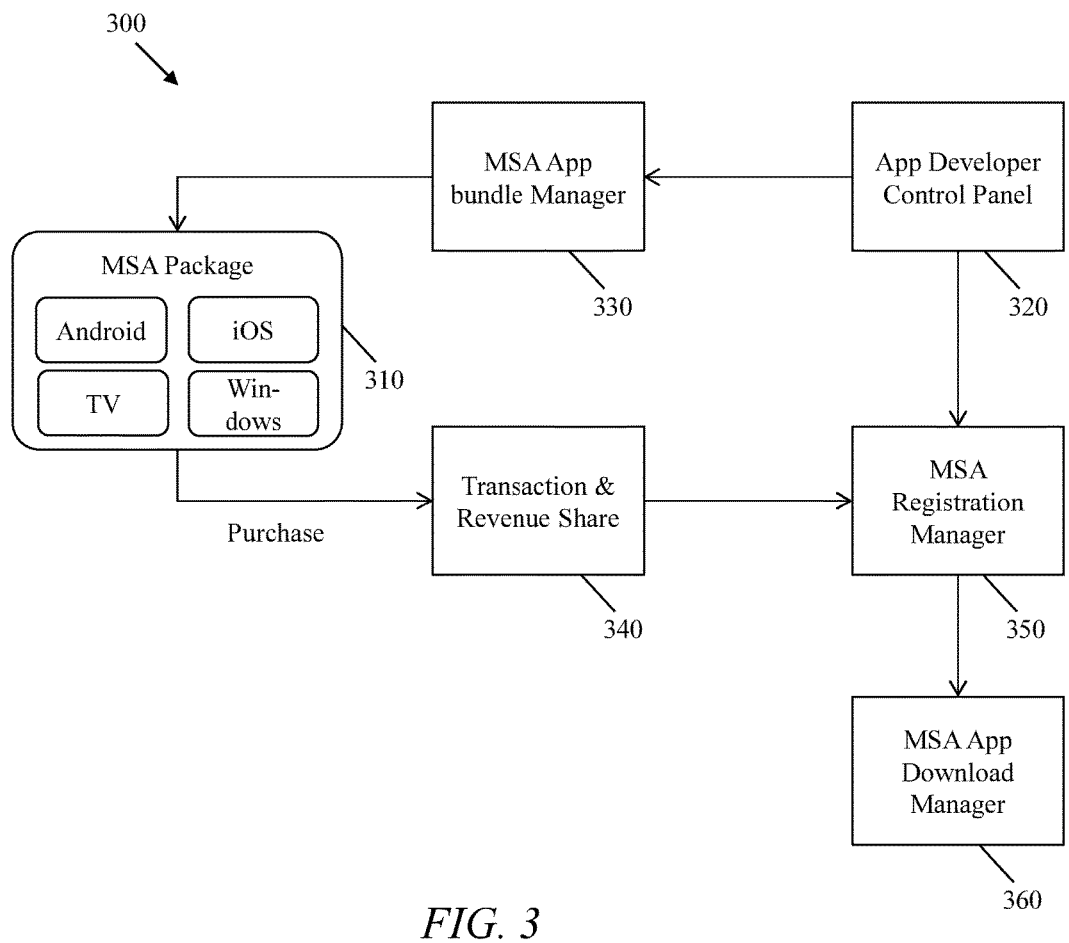
FIG. 3 is a schematic diagram of an MSA provision process for developers.

FIG. 3 is a schematic diagram of an MSA provision process 300 for developers or other app stores, in accordance with a disclosed embodiment. One or more app developers may develop a plurality of apps or a plurality of versions for one app, thus the app developers may know all relationships between related apps. Accordingly, the developers may bundle related apps together to generate an MSA package 310. An app developer control panel 320 offers an interface for the developers to define the MSA package 310, which may be managed by an MSA app bundle manager 330, or the MSA app bundle manager 330 may define the requirement of the MSA package 310 and send the requirement via the interface to the developers for making the MSA package. In an alternative embodiment, the MSA app bundle manager 330 may package and bundle the apps after it gets the apps from the developer. In yet another embodiment, an app provider control panel (not shown in FIG. 3) may offer an interface for the other app stores to define the MSA package 310, which may be managed by an MSA app bundle manager 330, or the MSA app bundle manager 330 may define the requirements of the MSA package 310 and send the requirement via the interface to the other app stores for making the MSA package. In another embodiment, the MSA app bundle manager 330 may package and bundle the apps to generate or form the MSA package 310 after it gets the apps from the other app stores. Bundling and pricing of apps in the MSA package 310 may be coordinated by the MSA app bundle manager 330. The MSA package 310 may be offered for sale as a whole at a bundle price, or a variety of combination of apps in the MSA package 310 may be offered according to various considerations, for example license policy or requirements from the user. If the apps were developed by different developers and/or app store, revenue generated by selling the MSA package can be shared amongst them.

A transaction and revenue sharing module 340 in the app store may complete a purchase or rent order from a user. After completion of the purchase order, an MSA registration manger 350 may be configured to register apps purchased by the user. The MSA registration manger 350 may monitor an MSA app download manager 360 to determine a download status of the apps, e.g., whether a certain app has been downloaded, and if so how many times the app has been downloaded, or the usage of the downloaded apps, etc. In an embodiment, if a user device is turned off or unavailable at the time of purchase or rent, a message containing authorization information (e.g., a license or validation code) may be sent to the user device, e.g., via software or as an email. The authorization process can be performed by the MSA registration manager 350. The MSA app download manager 360 may facilitate downloading and updating of apps in the MSA package 310.

Figure 4:
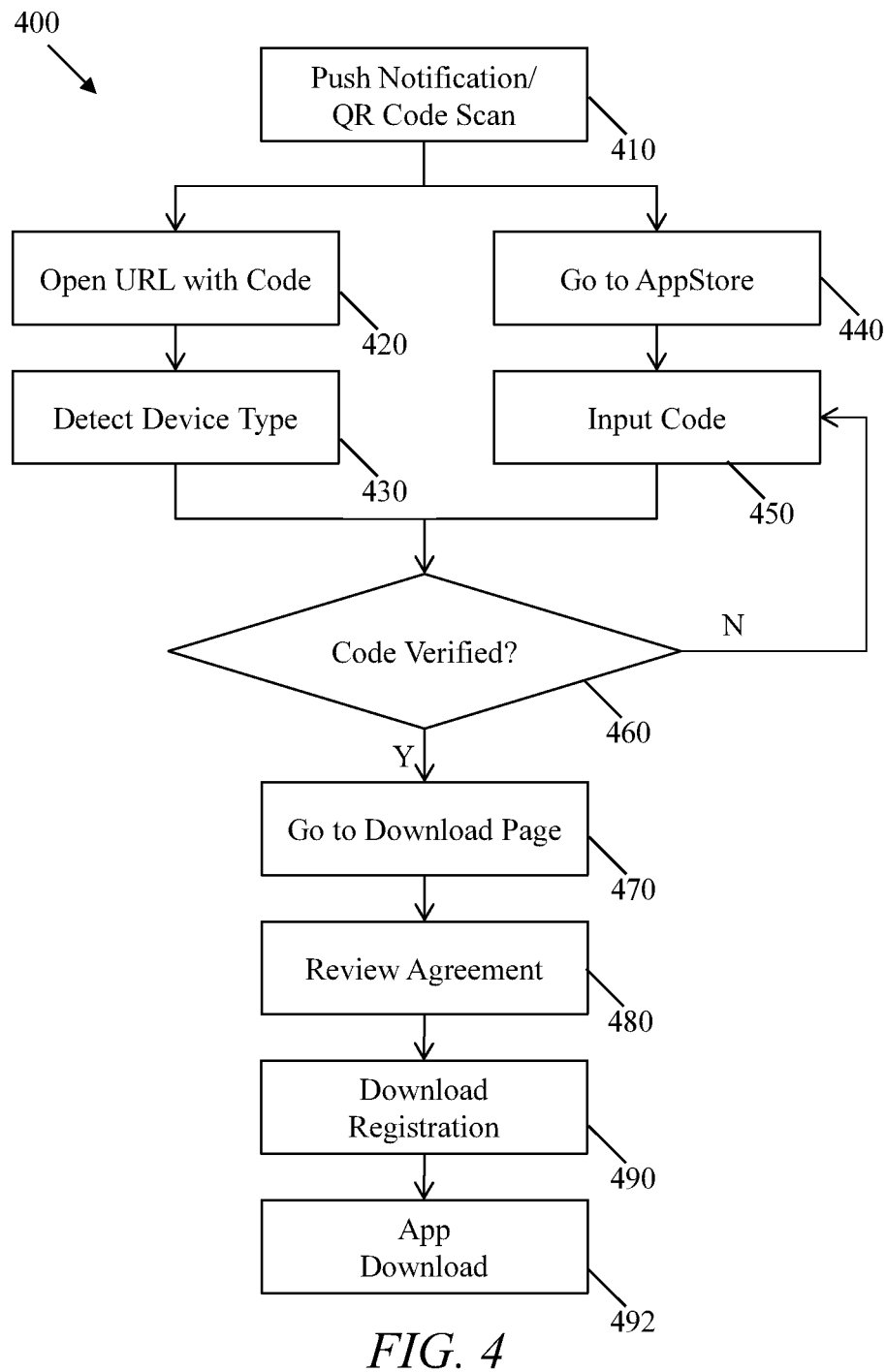
FIG. 4 is a flowchart of an MSA download process.

FIG. 4 is a flowchart of an MSA download process 400 in accordance with a disclosed embodiment. The process 400 may be implemented by the components of architectures disclosed herein (e.g., the architecture 100). Starting in block 410, the process 400 may enable a user device to receive a push notification, a QR code scan, or other methods to provision the apps. In a first method, the user device may receive the QR code with a license code and a uniform resource locator (URL), and may open such URL with the code as indicated by block 420. In block 430, an app store may detect a device type of the user device and proceed to block 460. For example, the device type of the user device may include, but not limited to, the operation system of the device and/or device capabilities including, e.g., the processor capabilities, or media capabilities (e.g., the support of which kind of the video, audio and/or text), or other capability of the device. In a second method, the user device may be direct to a suitable place in the app store as indicated by block 440, and manually input the received code as indicated by block 450.

After going through either the first or second method, in block 460, the app store may verify the code received from the user device. If the code is valid, the process 400 proceeds to block 470, where a download page can be made accessible to the user device. If the code is invalid, the process 400 may return to the block 450 for re-entry of the code or the block 420. In an embodiment, the code verification process may verify the code according to the MSA package purchase or rent mechanism as described in the above embodiments associated with FIG. 3.

In block 480, the user may review an agreement laying out details regarding terms of downloading and/or usage of an app or an MSA package. After accepting the agreement, the download status may be registered as indicated by block 490. Then, the app may be downloaded onto the user device as indicated by block 492.

Figure 5:
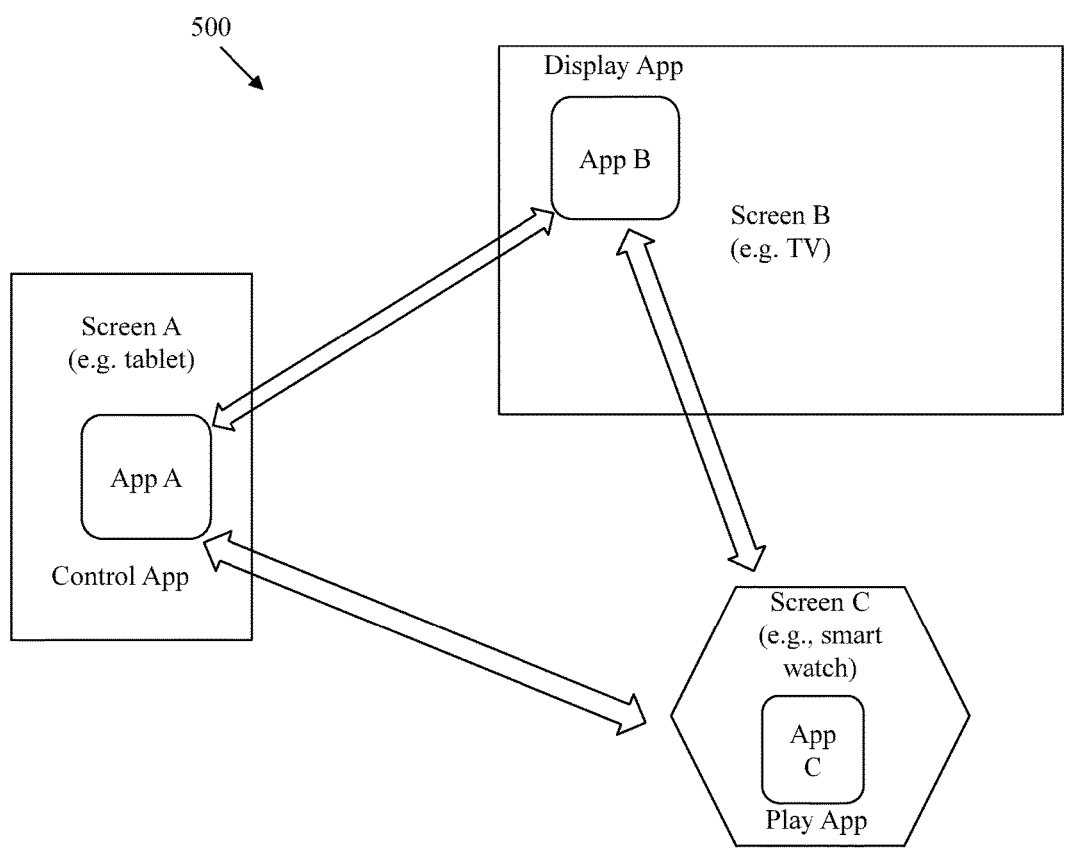
FIG. 5 is a schematic diagram of an examplary relationship 500 among three apps in an MSA package.

As discussed above, apps contained in an MSA package may be different apps related with one another or different versions of the same app. FIG. 5 is a schematic diagram of an examplary relationship 500 among three apps in an MSA package. The relationship 500 may be referred to as a peering hook, since the related apps can be considered as hooked together through the relationship 500. As shown in FIG. 5, Screen A has an App A installed thereon, Screen B has App B installed thereon, and Screen C has App C installed thereon. App A may be a control app installed on a tablet or smartphone for full functional control, App B may be a play app installed on a smart watch or an in-car device (e.g., as a mini-version of the control app, for playing music, or for converting text messages to audible sound), and App C may be a display app installed on a television for showing information (e.g., lyrics, texts, settings, and/or video). One of ordinary skill in the art will recognize that, depending on the apps, the relationships in an MSA package may be any suitable type, such as a play-control relationship, a control-display relationship, a full version-mini version relationship, a hooking relationship, different versions of the same app (depending on device types or operating systems), or combinations thereof.

Figure 6:
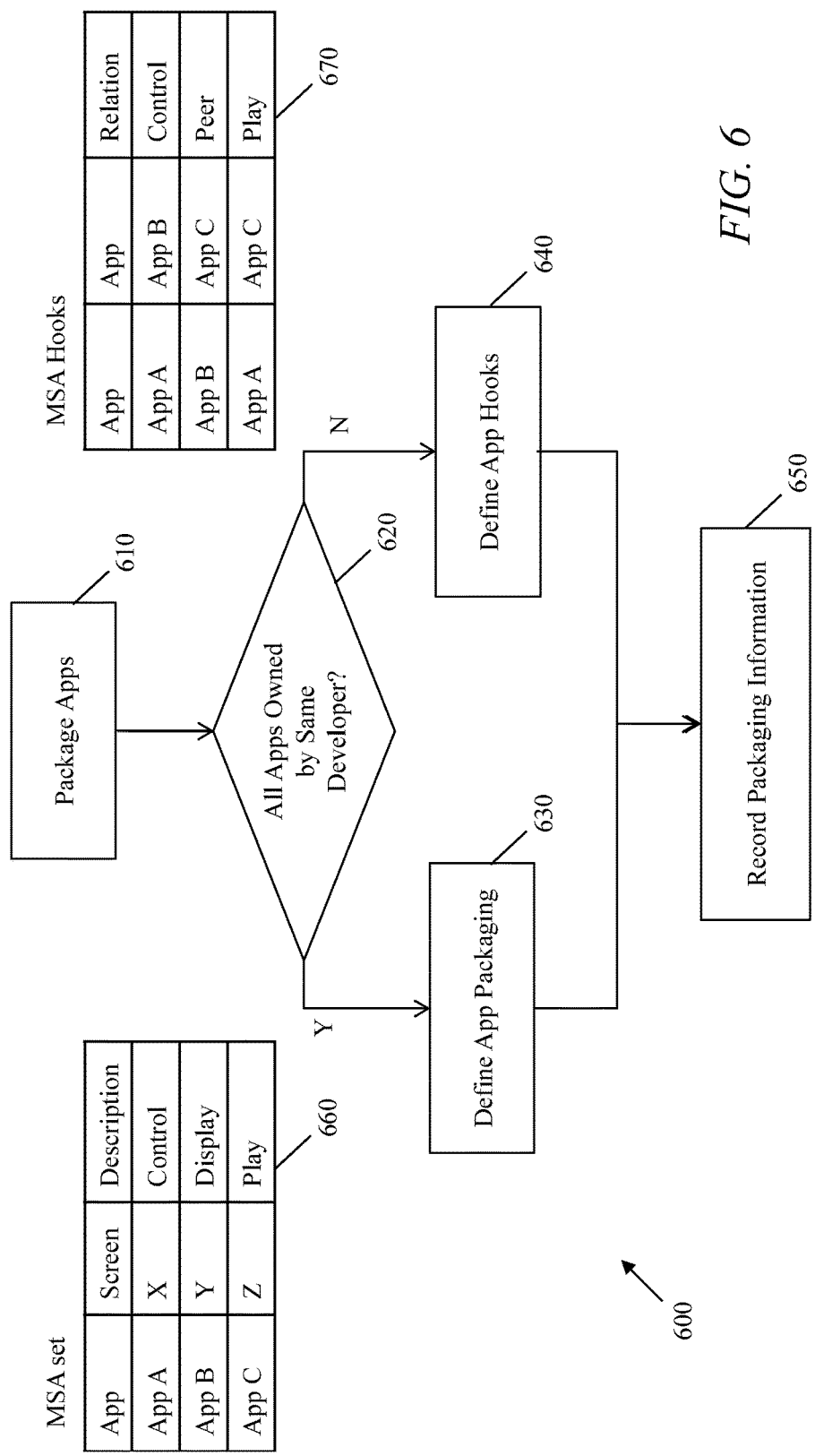
FIG. 6 is a flowchart of an MSA packaging process.

FIG. 6 is a flowchart of an MSA packaging process 600 in accordance with a disclosed embodiment. As indicated by block 610, multiple apps may be packaged into an MSA package. As indicated by block 620, depending on whether all apps in an MSA package are owned by the same developer (an examplary condition), the relationship(s) among the apps may be defined differently. If all apps are owned by the same developer, the apps may be defined as an integrative set in block 630. As illustrated by table 660, the integrative set may contain multiple apps including control app A designed for screen X, display app B designed for screen Y, and play app C designed for screen Z. The multiple apps may be used as integrative parts to provide a certain service, thus the multiple apps may be offered for sale as a whole. As mentioned above, an MSA package policy or requirement may be defined by the app store with or without considering the user's request or requirement, and may send the defined MSA package policy or requirement to an app developer or another app store. The MSA packaging process may be processed by the app store system using the apps from the developer or other app store systems according to the defined MSA package policy or requirement. The app store system may get the MSA package including the apps directly from the developers or other app store systems. Then, the app store system may manage, modify, or update the relationship of the apps in the MSA package. Further, the app store system may provision, sale, rent, delivery, or distribute the apps in the MSA package according the MSA package policy or requirement, or the redefined or modified relationship between the apps in the MSA package.

On the other hand, if apps in an MSA package are from a plurality of developers or app stores, the apps may be defined as having hooks or relationships (a looser term than integrative) among them in block 640. As illustrated by table 670, apps A and B have a control relation or hook, apps B and C have a peer relation, and apps A and C have a play relation. In this case, related apps may be more likely to be recommended to a user after purchase of a first app, rather than offered for sale as a whole. Since the relationships in apps of an MSA package indicate how they work together, such information may be recorded in the app store as indicated by block 650. Thus, the app store may make various decisions based on packaging information and actions of the user device.

Figure 7:
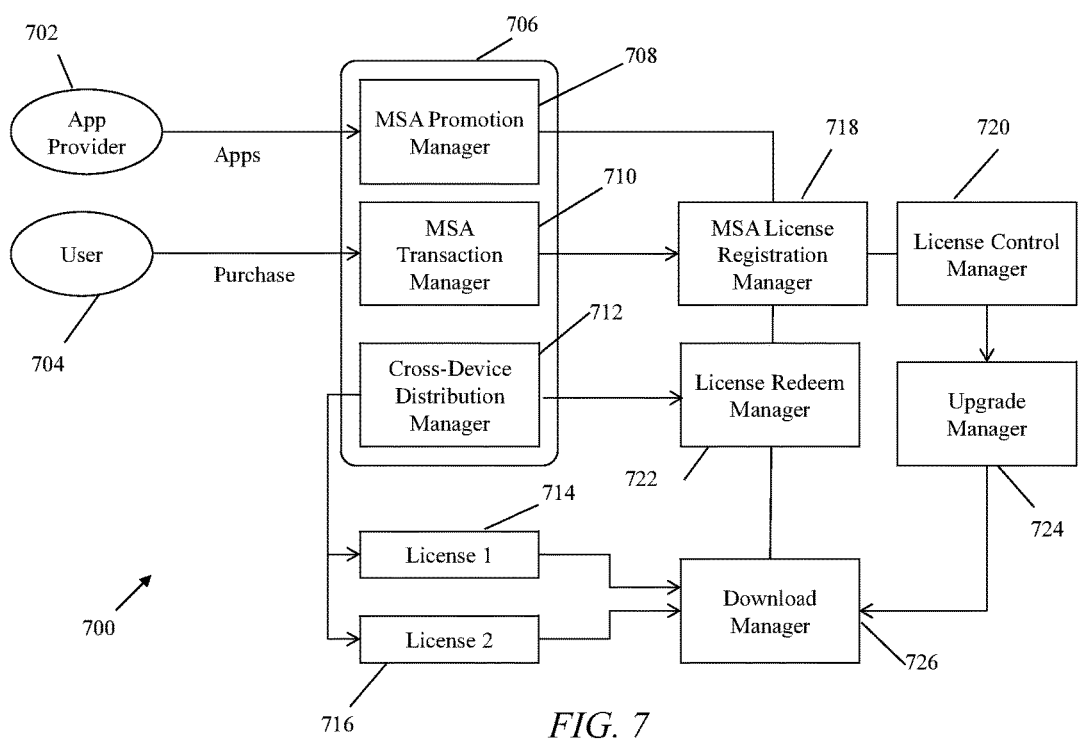
FIG. 7 is a schematic diagram of an MSA management architecture.

FIG. 7 is a schematic diagram of an MSA management architecture 700 in accordance with a disclosed embodiment. The architecture 700 may include an app provider 702 (e.g. the app developers or other app store systems), a user 704 which may be a single user or a user group including a set of users with certain relationship, an MSA manager 706, a first license 714, a second license 716, an MSA license registration manager 718, a license control manager 720, a license redeem manager 722, an upgrade manager 724, and a download manager 726 arranged as shown in FIG. 7. More specifically, the MSA manager 706 may comprise an MSA promotion manager 708, an MSA transaction manager 710, and a cross-device distribution manager 712. The app provider 702 may be an app developer that develops and configures an MSA package. For example, the app provider 702 may set a wholesale price for the MSA package using the MSA promotion manger 708 in which, for example, a promotion policy is included.

The user 704 may own one or more user devices. On the other hand, user devices can belong to a same user or to different users. The user 704 may initiate a transaction (e.g., for free or at a price) with the MSA transaction manager 710, which handles transactions with users. After the transaction, one or more licenses or validation codes may be generated and recorded by the MSA license registration manager 718. A license may define an authorization to download and use an app, and sometimes how long the app can be used. The MSA license registration manager 718 may forward the licenses to the license redeem manager 722, which may then forward the licenses to the cross-device distribution manager 712. The licenses 714 and 716 may be sent by the cross-device distribution manager 712 to the download manager 726 (or directly to the user) via any suitable method. For instance, the licenses 714 and 716 may be emailed, transmitted via a simple message service (SMS), or otherwise pushed to the user 704.

After the user 704 downloads a first app in an MSA package onto a first user device, the app store may notify a push server to download additional related apps. Alternatively, the user 704 can initiate downloading on another user device using a QR code. Proper upgrade can also be performed on different devices using the upgrade manager 724.

Note that the MSA management architecture 700 may include other components, such as an app management component, a cross-device license management component, and an account setup and email distributor. The app management component may include an app purchase manager, an app download manager, an app license generator, an app redeem manager, and an app upgrade manager. The account setup and e-mail distributor component may include a user information table and may email codes granting a license to individuals. The account setup and email distributor component may provide for a shared cost purchase (e.g., $2.99 per student in class to purchase an app). For example, a user information table may be used by the app store to distribute licenses to multiple registered users. Individual validation codes or licenses may be sent to users via emails, which can be provided by the purchaser during a transaction.

Figure 8:
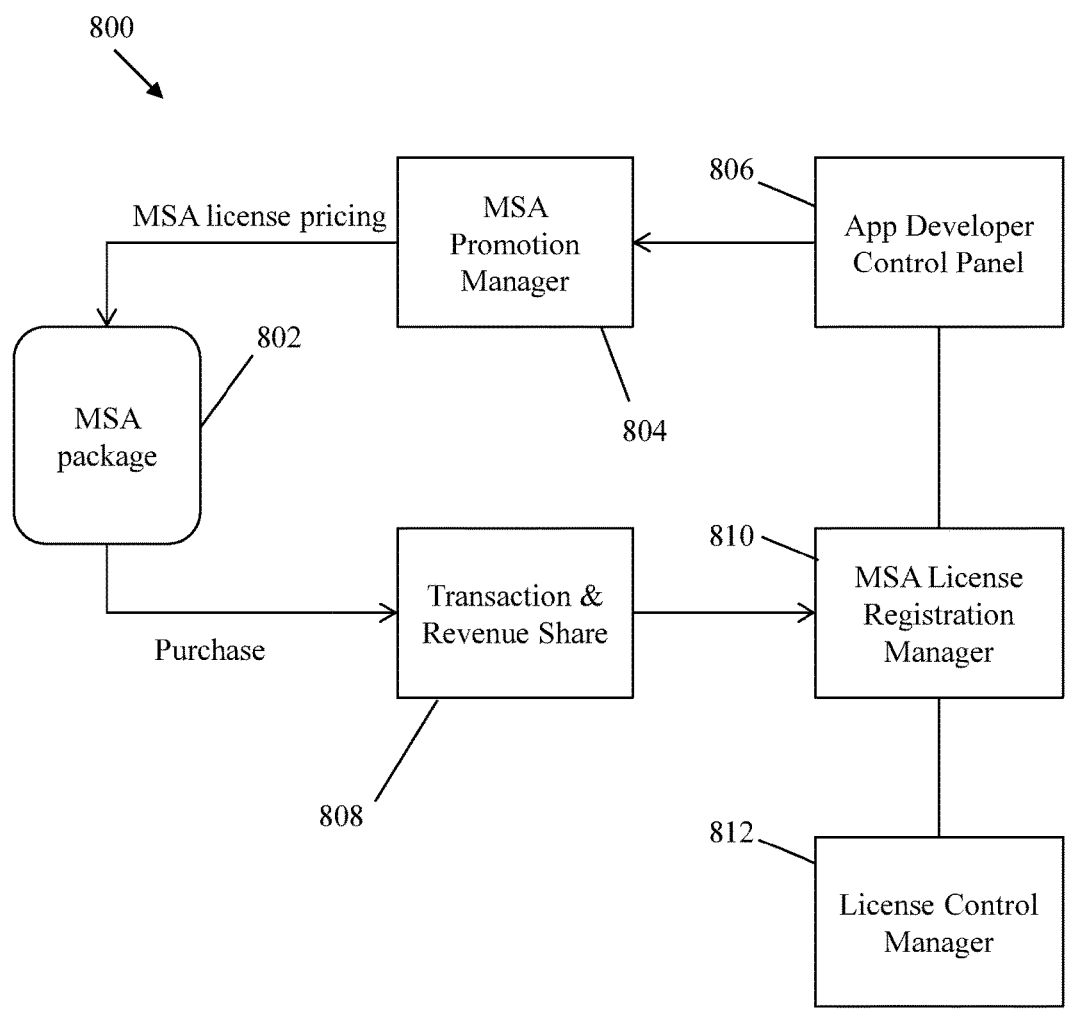
FIG. 8 is a schematic diagram of an MSA license provision process.

FIG. 8 is a schematic diagram of an MSA license provision process 800 in accordance with a disclosed embodiment. The provision process 800 may be similar to the provision process 300 discussed above. The MSA license provision process 800 may involve an MSA package 802, an MSA promotion manager 804, an app developer control panel 806, a transaction and revenue share component 808, an MSA license registration manager 810, and a license control manager 812. The MSA promotion manager 804, the MSA license registration manager 810, and the license control manager 812 may be similar to their counterparts, i.e., the MSA promotion manager 708, the MSA license registration manager 718, and the license control manager 720, respectively.

MSA license pricing and purchase data flows may proceed through the components as indicated by arrows in FIG. 8. The app developer control panel 806 may be formed by one or more app developers. Developers can develop apps and form the MSA package 802 by defining relationships between apps. The app developer control panel 806 may configure pricing of the MSA package 802 using the MSA promotion manager 804. The revenue share component 808 may enable a revenue generated by selling the MSA package 802 to one or more users to be shared among developers. Further, the license control manager 812 may control or oversee the MSA license registration manager 810, in which the license may be registered for verification purposes.

Figure 9:
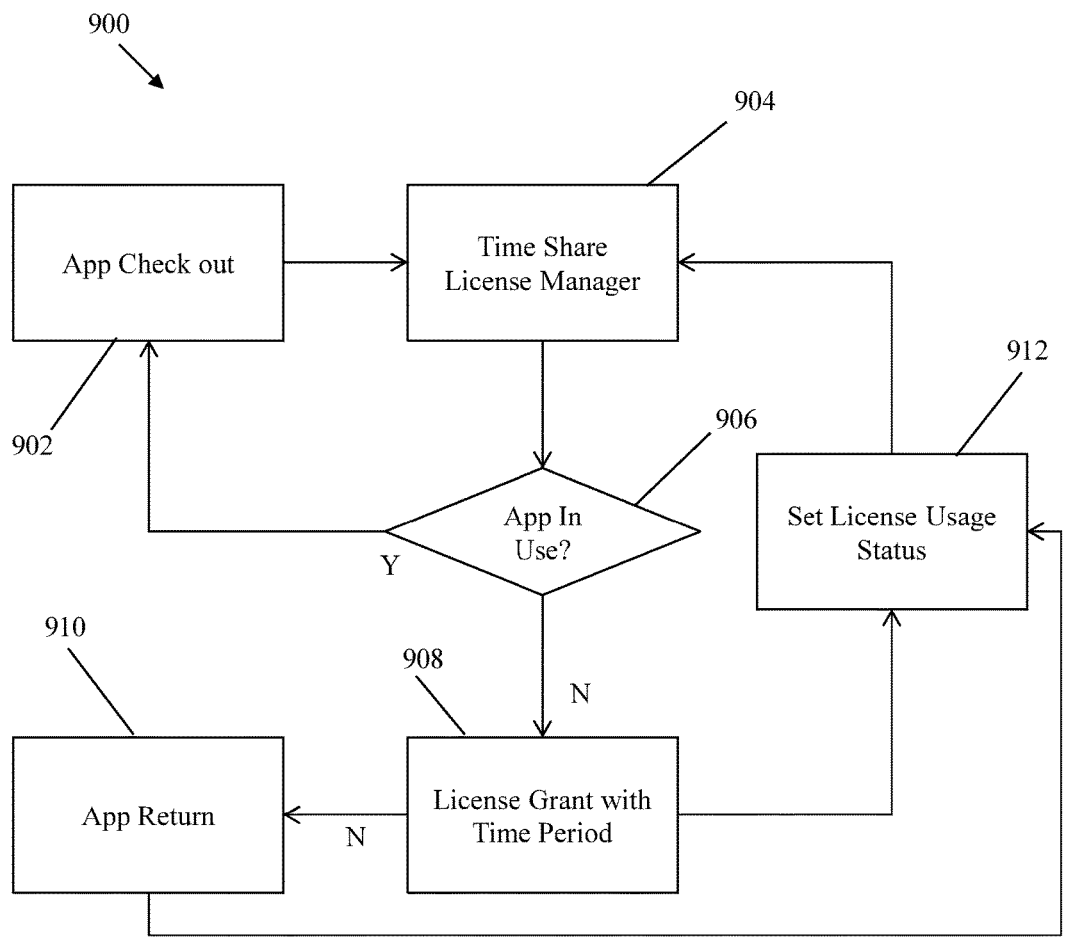
FIG. 9 is a flowchart of a time share application license control method.

When a user buys an MSA package, time sharing can be performed among multiple devices. FIG. 9 is a flowchart of a time share application license control method 900 in accordance with a disclosed embodiment. The method 900 may begin at block 902 where an app may be checked out. At block 904, a time share license manager may be invoked and, at block 906, determine whether the app is in use. If, at bock 906, the app is in use, the method 900 may proceed back to block 902 where the user may attempt to check out the app again or check out a different app. Alternatively, the method 900 may end after block 906 if the app is in use. If, at block 906, the app is not in use, then the method 900 may proceed to block 908 where the license is granted to the user with a time period within which the license is valid and the app may be used. If the time is outside of the time period, then the method 900 may proceed to block 910 where the app may be returned, after which the method 900 may proceed to block 912 where the license usage status may be set to indicate that the license is returned. If, at block 908, the time is within the license grant time period, the method 900 may proceed to block 912 where the license usage status may be set to "in use". From block 912, the method 900 may proceed to block 904 with an indication of whether the app is in use.

Figure 10A:
FIGS. 10A and 10B illustrate a first license management table and a second license management table, respectively.
Figure 10B:

FIGS. 10A and 10B illustrate a first license management table 1000 and a second license management table 1020, respectively, in accordance with a disclosed embodiment. The license management tables 1000 and 1020 may be kept as one or more suitable data structures in an app store, e.g., at a license registration manger. The table 1000 may include an app field, an MSA license field, a license type field, and licenses field. The MSA license (ML) field specifies an MSA package license identification or identifier (ID). The license type field may indicate the type of license that is associated with the MSA license app. One app can be in multiple MSA packages and associated with multiple MSA licenses. For example, the license type may include a multiple license (simultaneous use allowed), a common license such as a time share license (one user device at a time), or the device type (e.g., ANDROID®, WINDOWS®, BLACKBERRY®) for which the license is valid. Depending on the license type, the license field for a particular app may contain one or more licenses (e.g., licenses denoted as L1, L2, and L3).

The license management table 1020 provides more details that may be specified in the app store. In an embodiment, the table 1020 may include a license field, a validity field, a user field, and a device field. The validity field may indicate how long the license for an app is valid or when the license for an app will expire. A validity period of a license may be one day, one year, or any other duration. The user field may indicate the identity of a user for which a license is valid. The device field may indicate the identity or type of device (e.g., ANDROID® or IOS®) for which the license is valid.

As described above, searching and matching of related apps in an MSA package may be accomplished using various approaches. For example, suppose a user has downloaded a first app on his or her television. Then, the app store can automatically find one or more apps related to the first app, and recommend the related apps to the user. For another example, the first app may generate a QR code, so the user can scan and send the QR code to the server, which may then perform the match. The QR code may contain a URL and possibly license information.

An MSA account may include an MSA account user name, transaction information, an app license table, license gifting status, and license control. For example, when downloading an MSA package, a first user may register his or her information including a user name. The first user may buy an MSA package, e.g., as a Christmas gift, and send it to friends and relatives. Thus, the gifting status may indicate whether the package has been downloaded by the gift recipients.

The disclosed embodiments may provide for control of who can see, who can download, how many times an app may be downloaded, and how long the app can be used. Additionally, the disclosure may provide license control on screens for privacy or other security settings. For example, a package can contain security settings to impose age limitations. The disclosure may provide rotation key management, in which one license may be shared (similar to book lending in which if someone checks a book out, others may be blocked). The license may be a shared sequential license. For example, one user may check in an app, start the app, use the app, and check out the app.

As described above, this disclosure provides a solution for MSA purchase, distribution, download, usage, and sharing. This disclosure may support developers to configure or provision an MSA package by bundling and packaging related apps. The disclosed design also includes procedures for MSA promotion provision, app purchase, and distribution/gifting. Embodiments enabling automatic provisioning and distribution of apps or contents may improve user experience in various computing environments such as in mobile devices or wearable devices (e.g., smart watch or GOOGLE GLASS®).

Figure 11:
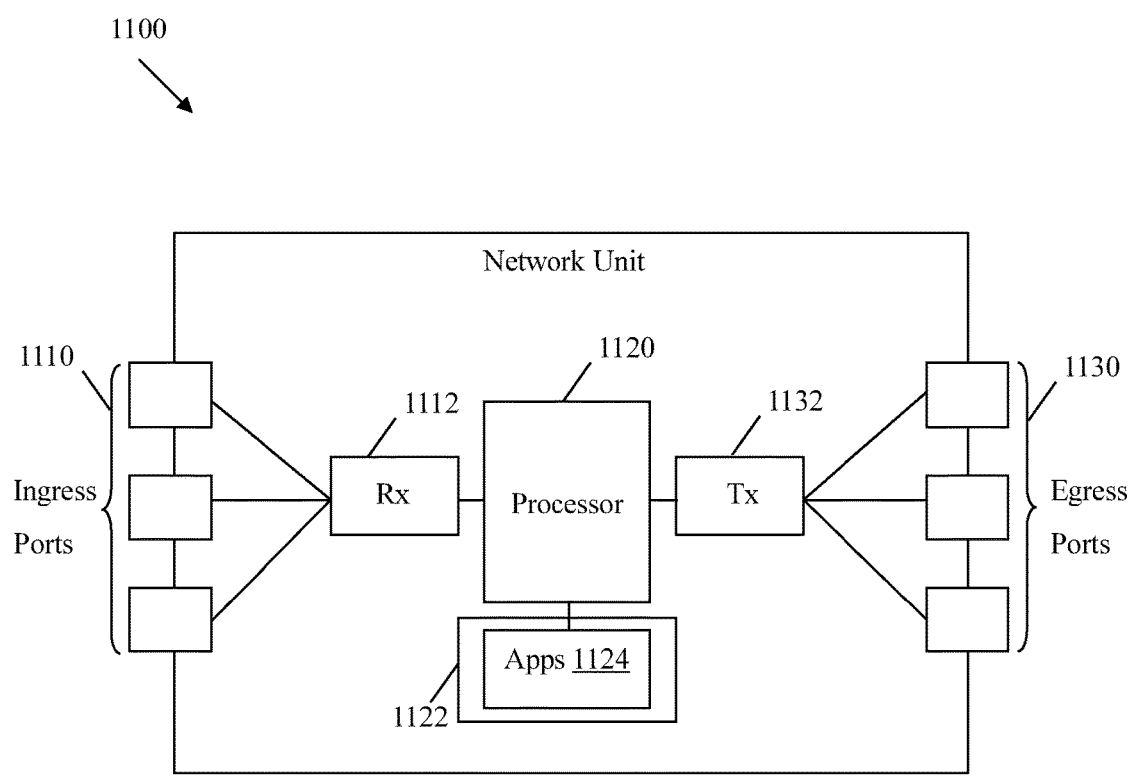
FIG. 11 is a schematic diagram of a network device.

FIG. 11 is a schematic diagram of a computer system or network device 1100 in accordance with a disclosed embodiment. The network device 1100 may be implemented in any device, such as an app store system (e.g., the app store system 130) or a user device (e.g., the user device 110 or 120) disclosed herein, capable of receiving, processing, and transmitting messages to and from a network. The network device 1100 may comprise one or more ingress ports 1110 coupled to a receiver 1112 (Rx), which may be configured for receiving packets from other network components. The network device 1100 may comprise a logic unit or processor 1120 coupled to the receiver 1112 and configured to process the packets or otherwise determine to which network components to send the packets.

The processor 1120 may be implemented using hardware or a combination of hardware and software. The processor 1120 may be implemented as one or more central processor unit (CPU) chips, cores (e.g., a multi-core processor), field-programmable gate arrays (FPGAs), application specific integrated circuits (ASICs), and/or digital signal processors (DSPs). The processor 1120 may be configured to implement any of the functional modules or units described herein, such as the MSA manger 136, the search and match module 134, parts of the app store system 130, the push server 240 (or other types of third party server), the app developer control panel 320, the MSA app bundle manager 330, the transaction and revenue sharing module 340, the MSA registration manager 350, the MSA app download manager 360, the MSA promotion manager 708, the MSA transaction manager 710, the cross-device distribution manager 712, the MSA license registration manager 718, the license control manager 720, the license redeem manager 722, the upgrade manager 724, the download manager 726, the time share license manager 904, or any other functional component known by one of ordinary skill in the art, or any combinations thereof.

The network device 1100 may further comprise at least one memory 1122. The memory 1122 may be configured to store one or more apps 1124. The apps 1124 may be implemented using any suitable form, e.g., written in any programming language and having any suitable user interface. Some of the apps 1124 may be related apps in an MSA package. The memory 1122 may store the MSA package and one or more relationships among the set of related apps in the MSA package. The relationships among the related apps may be defined by the processor 1112, or received by the receiver 1112 from an app developer or an app store user. In practice, there may be bidirectional traffic processed by the network device 1100, thus some ports may both receive and transmit packets. In this sense, the ingress ports 1110 and the egress ports 1130 may be co-located or may be considered different functionalities of the same ports that are coupled to transceivers (Rx/Tx). One of more of the processor 1120, the memory 1122, the receiver 1112, and the transmitter 1132 may also be configured to at least partially implement or support any of the implementations described above, such as the push and sync procedure 200, the MSA provision process 300, the MSA download process 400, the packaging process 600, the license provision process 800, and the time share application license control method 900.

It is understood that, by programming and/or loading executable instructions onto the network device 1100, at least one of the processor 1120 and the memory 1122 can be changed. As a result, the network device 1100 may be transformed in part into a particular machine or apparatus (e.g. a network router having the functionality taught by the present disclosure). The executable instructions may be stored on the memory 1122 and loaded into the processor 1120 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and random access memory (RAM)). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method comprising:
sending, by a mobile phone, a first request to an application (app) store system;
in response to the first request, pushing, by the app store system, a first version of an app to the mobile phone;
installing the first version of the app on the mobile phone;
automatically pushing, by the app store system, a second version of the app to a watch, wherein the mobile phone is associated with the watch, wherein the mobile phone and the watch have different operating systems;
installing the second version of the app on the watch;
sending, by the mobile phone, a second request to the app store system;
in response to the second request, pushing, by the app store system, a third version of the app to the mobile phone, wherein the third version of the app is an updated version of the first version of the app for the mobile phone;
installing the third version of the app on the mobile phone;
automatically pushing, by the app store system, a fourth version of the app to the watch, wherein the fourth version of the app is an updated version of the second version of the app for the watch;
installing the fourth version of the app on the watch;
wherein before pushing the first version of the app sending a validation code to the app store system; and
after pushing the first version of the app, monitoring a download status of the first version of the app by the app store system.

2. The method of claim 1, further comprising sending, to the app store system, a user customized relationship between each version of the app.

3. A system comprising: an application (app) store system, a mobile phone and a watch, the mobile phone and the watch respectively comprising:

a processor;
a transmitter coupled to the processor and configured to send messages to the app store system; and
a receiver coupled to the processor and configured to receive messages from the app store system,
wherein the mobile phone sends a first request to the app store system;
in response to the first request, the app store system pushes a first version of an app to the mobile phone;
the mobile phone installs the first version of the app;
the app store system automatically pushes a second version of the app to the watch, wherein the mobile phone is associated with the watch;
the watch installs the second version of the app;
the mobile phone sends a second request to the app store system;
in response to the second request, the app store system pushes a third version of the app to the mobile phone, wherein the third version of the app is an updated version of the first version of the app for the mobile phone;
the mobile phone installs the third version of the app;
the app store system automatically pushes a fourth version of the app to the watch, wherein the fourth version of the app is an updated version of the second version of the app for the watch;
the watch installs the fourth version of the app;
wherein the processor of the mobile phone is further configured to: run an operating system that is different from that of the watch; and send a validation code to the app store system via the transmitter; and
wherein the app store system monitors a download status of the first version of the app after pushing the first version of the app.

4. The method of claim 1, wherein the app store system comprises a multi-screen application (MSA) package comprising the first version of the app and the second version of the app, or the third version of the app and the fourth version of the app.

5. The method of claim 1, wherein the method further comprises: receiving a search request from the mobile phone after installing the first version of the app on the mobile phone; identifying, by the app store system, the second version of the app in response to the search request.

6. The method of claim 1, wherein the method further comprises: verifying a validity period of the license for pushing the first version of the app to the mobile phone after the app store system responds to the first request.

7. The system of claim 3, wherein the app store system comprises a multi-screen application (MSA) package comprising the first version of the app and the second version of the app, or the third version of the app and the fourth version of the app.

8. The system of claim 3, wherein the app store system receives a search request from the mobile phone after installation of the first version of the app on the mobile phone and wherein the app store system identifies the second version of the app in response to the search request.

9. The system of claim 3, wherein the app store system verifies a validity period of the license for pushing the first version of the app to the mobile phone after the app store system responds to the first request.

* * * * *

UNITED STATES PATENT AND TRADEMARK OFFICE
CERTIFICATE OF CORRECTION

PATENT NO. : 10,530,853 B2
APPLICATION NO. : 14/105097
DATED : January 7, 2020
INVENTOR(S) : Guangbin Fan Page 1 of 1

It is certified that error appears in the above-identified patent and that said Letters Patent is hereby corrected as shown below:

In the Claims

Column 16, Lines 57-61, Claim 8 should read:
8. The system of claim 3, wherein the system further comprises: receiving a search request from the mobile phone after installing the first version of the app on the mobile phone; identifying, by the app store system, the second version of the app in response to the search request.

Signed and Sealed this
Thirty-first Day of March, 2020

Andrei Iancu
*Director of the United States Patent and Trademark Office*